United States Patent
Jo et al.

(10) Patent No.: US 11,858,860 B2
(45) Date of Patent: Jan. 2, 2024

(54) SINTERING JIG

(71) Applicant: Samsung Electronics Co., Ltd., Suwon-si (KR)

(72) Inventors: Giyoung Jo, Suwon-si (KR); Chan Kwak, Yongin-si (KR); Taewon Jeong, Yongin-si (KR)

(73) Assignee: Samsung Electronics Co. Ltd., Gyeonggi-do (KR)

( * ) Notice: Subject to any disclaimer, the term of this patent is extended or adjusted under 35 U.S.C. 154(b) by 1289 days.

(21) Appl. No.: 16/391,767

(22) Filed: Apr. 23, 2019

(65) Prior Publication Data

US 2020/0172445 A1 Jun. 4, 2020

(30) Foreign Application Priority Data

Dec. 3, 2018 (KR) .................. 10-2018-0153717

(51) Int. Cl.
| | |
|---|---|
| *B30B 15/02* | (2006.01) |
| *C04B 35/64* | (2006.01) |
| *C04B 35/48* | (2006.01) |
| *C04B 41/87* | (2006.01) |
| *B29C 35/02* | (2006.01) |
| *B29C 33/00* | (2006.01) |

(52) U.S. Cl.
CPC .......... *C04B 35/64* (2013.01); *B29C 33/0022* (2013.01); *B29C 35/02* (2013.01); *B30B 15/022* (2013.01); *C04B 35/48* (2013.01); *C04B 41/87* (2013.01); *Y10S 425/029* (2013.01)

(58) Field of Classification Search
CPC ......... B29C 35/00; B29C 37/00; B29C 64/20; B30B 35/02; B30B 15/02

USPC .................................................. 425/346, 78
See application file for complete search history.

(56) References Cited

U.S. PATENT DOCUMENTS

| | | | | |
|---|---|---|---|---|
| 3,360,829 A | * | 1/1968 | Germ ..................... | B29C 45/02 |
| | | | | 249/105 |
| 5,438,521 A | * | 8/1995 | Lindstrom ........... | G05B 19/404 |
| | | | | 700/176 |
| 2006/0197259 A1 | * | 9/2006 | Ishler ..................... | B28B 3/06 |
| | | | | 264/319 |
| 2011/0318411 A1 | * | 12/2011 | Luber ................... | B29C 43/146 |
| | | | | 514/648 |

(Continued)

FOREIGN PATENT DOCUMENTS

WO WO-2018139063 A1 * 8/2018 ........... B29C 64/245

OTHER PUBLICATIONS

Schroeter, Christian et al. "High throughput screening of ferroelectric thin film libraries." *Journal of Applied Physics* 100 (2006): 114114-1-114114-7.

(Continued)

*Primary Examiner* — Thu-Khanh T. Nguyen
(74) *Attorney, Agent, or Firm* — HARNESS, DICKEY & PIERCE, P.L.C.

(57) ABSTRACT

A sintering jig according to the disclosure includes a first plate including a plurality of protrusions and a second plate stacked on the first plate and including through holes corresponding to the protrusions. The through hole includes a cylindrical portion through which the protrusion enter and exit and a conical portion widening towards an upper surface of the second plate from the cylindrical portion.

8 Claims, 7 Drawing Sheets

(56) References Cited

U.S. PATENT DOCUMENTS

2015/0056321 A1* 2/2015 Zhang .................... B29C 64/35
                                                425/225
2015/0102202 A1* 4/2015 Torii .................. B29C 33/3828
                                                156/280
2015/0192518 A1    7/2015 Baxter et al.

OTHER PUBLICATIONS

Stegk, Tobias A. et al. "High-Throughput Synthesis and Characterization of Bulk Ceramics from Dry Powders." *Journal of Combinatorial Chemistry* 10.2 (2008): 274-279.

Weng, Xiaole et al. "High-Throughput Continuous Hydrothermal Synthesis of an Entire Nanoceramic Phase Diagram." *Journal of Combinatorial Chemistry* 11.5 (2009): 829-834.

* cited by examiner

SINTERING JIG

CROSS-REFERENCE TO RELATED APPLICATION

This application claims the benefit of Korean Patent Application No. 10-2018-0153717, filed on Dec. 3, 2018, in the Korean Intellectual Property Office, the disclosure of which is incorporated herein in its entirety by reference.

BACKGROUND

1. Field

The present disclosure relates to sintering jigs used for sintering ceramic powder.

2. Description of the Related Art

The characteristics of a ceramic used for electronic devices may vary according to the composition of the ceramic. For example, a dynamic random-access memory (DRAM) may include a single capacitor and a single transistor. The capacitor includes a dielectric ceramic between two electrodes. The dielectric constant of the dielectric ceramic determines the performance of the capacitor.

The composition of the dielectric ceramic may be varied for the improvement of the performance of the capacitor and/or the miniaturization of the capacitor. A high-throughput screening (HTS) is a method of detecting characteristics of a plurality of materials having different compositions. The HTS method may be used to detect a dielectric characteristic of a ceramic. A few tens to thousands of dielectric samples may be made according to the compositions that constitute the dielectric and the contents of the compositions. An improved or even optimum dielectric ceramic may be found by detecting dielectric characteristics after sintering the samples.

SUMMARY

Provided are sintering jigs for detecting characteristics of materials according to a composition of a ceramic by using a high-throughput screening (HTS) method.

Additional aspects will be set forth in part in the description which follows and, in part, will be apparent from the description, or may be learned by practice of the presented embodiments.

According to an aspect of an embodiment, a sintering jig includes: a first plate including a plurality of protrusions on a surface thereof; and a second plate on the first plate and including through holes corresponding to the protrusions, wherein each of the plurality of through holes includes a cylindrical portion through which a corresponding one of the plurality of protrusions enter and exit and a conical portion widening from the cylindrical portion towards an upper surface of the second plate.

The plurality of protrusions of the first plate may occupy portions of a corresponding one of the plurality of cylindrical portions when the first plate is combined with the second plate.

The first plate and the second plate may include zirconia.

Each of the plurality of protrusions may have a surface roughness of 0.2 μm or less.

An upper surface of each of the plurality of protrusions is a convex surface in which a central portion of the convex surface protrudes upwards.

According to an aspect of another embodiment, a sintering jig includes: a first plate including a plurality of through holes, a first surface, and a second surface, wherein the first and second surfaces face each other; and a plurality of bolts entering and exiting a corresponding one of the plurality of through holes from the second surface of the first plate for screw-coupling and blocking a lower side of each of the plurality of through holes.

Each of the plurality of through holes may include a cylindrical portion through which the protrusions enter and exit and a conical portion widening from the cylindrical portion towards the surface of the first plate.

Each of the plurality of cylindrical portions of the first plate may include screw grooves, and each of the plurality of bolts may include screw threads that combine with a corresponding one of the plurality of screw grooves.

The sintering jig may further include rims on each of the plurality of the cylindrical portions of the first plate, wherein an upper surface of each of the plurality of bolts and an upper surface of a corresponding one of the plurality of rims are coplanar when each of the plurality of bolts is screw-combined with the first plate.

The first plate and each of the plurality of bolts may include zirconia.

According to an aspect of another embodiment, a sintering jig includes: a flat first plate; a second plate on the flat first plate and including a plurality of through holes; and a plurality of hollow guide molds insertable into a corresponding one of the plurality of through holes of the second plate.

Each of the plurality of hollow guide molds may include an upper portion and a handle portion extending outwards from the corresponding upper portion thereof.

The sintering jig may further include a plurality of presses each including a cylindrical portion that enter and exit through an inner side of a corresponding one of the plurality of hollow guide molds.

The first plate and the second plate may include zirconia, and the hollow guide molds and the presses may include plastic.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
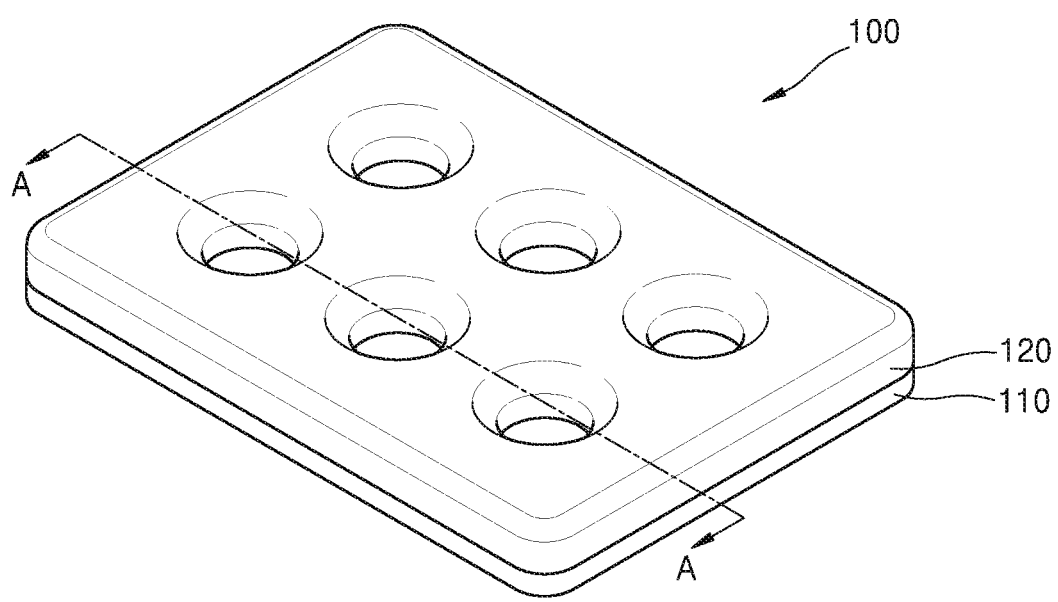
FIG. 1 is a schematic perspective view of a sintering jig according to an embodiment.

Reference will now be made in detail to embodiments, examples of which are illustrated in the accompanying drawings. In the drawings, thicknesses of layers or regions are exaggerated for clarity of the specification. The present embodiments may have different forms and should not be construed as being limited to the descriptions set forth herein.

It will be understood that when an element is referred to as being "on" or "above" another element, the element may be in direct contact with the other element or other intervening elements may be present.

In the following embodiments, the singular forms include the plural forms unless the context clearly indicates otherwise. It should be understood that, when a part "comprises" or "includes" an element in the specification, unless otherwise defined, it is not excluding other elements but may further include other elements.

The use of the term "the" and an instructional term similar to the "the" may be applied to both singular forms and the plural forms.

With respect to operations that constitute a method, the operations may be performed in any appropriate sequence unless the sequence of operations is clearly described or unless the context clearly indicates otherwise. The operations may not necessarily be performed in the order of sequence. All examples or example terms (for example, etc.) are simply used to explain in detail the technical scope of the disclosure, and thus, the scope of the disclosure is not limited by the examples or the example terms as long as it is not defined by the claims. It should be understood that embodiments described herein should be considered in a descriptive sense only and not for purposes of limitation. Descriptions of features or aspects within each embodiment should typically be considered as available for other similar features or aspects in other embodiments.

FIG. 1 is a schematic perspective view of a sintering jig 100 according to an embodiment.

Referring to FIG. 1, the sintering jig 100 may include a first plate 110 and/or a second plate 120. The second plate 120 may be stacked on the first plate 110. The first plate 110 may be referred to as a lower plate, and the second plate 120 may be referred to as an upper plate. The first plate 110 and the second plate 120 are a jig used for sintering a ceramic pellet formed of ceramic powder and may include a material that does not react with the ceramic at a high temperature. The first plate 110 and the second plate 120 may include zirconia.

Figure 2:
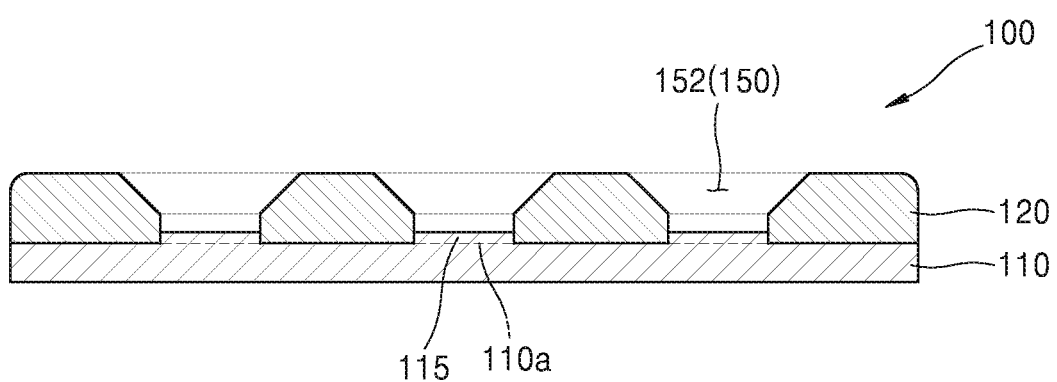
FIG. 2 is a cross-sectional view taken along line A-A of FIG. 1.
Figure 3:
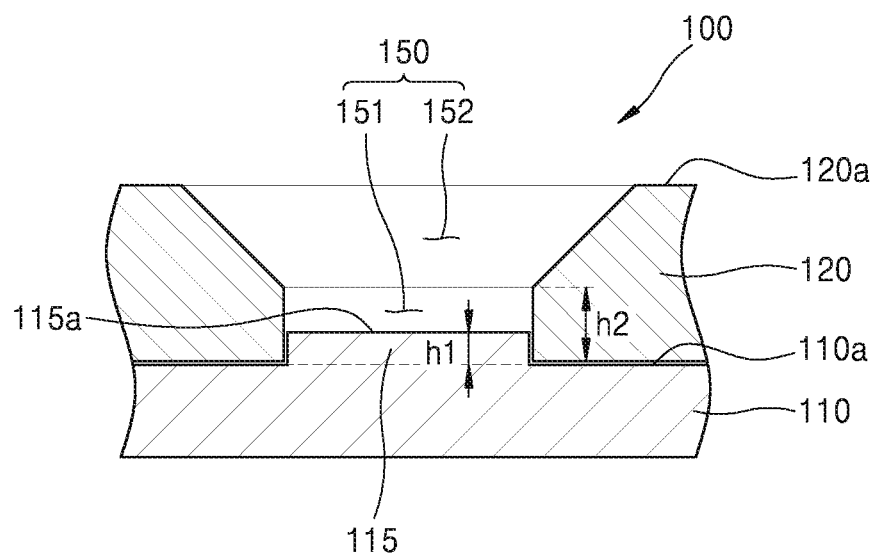
FIG. 3 is a magnified view of a portion of FIG. 2.

FIG. 2 is a cross-sectional view taken along line A-A of FIG. 1. FIG. 3 is a magnified view of a portion of FIG. 2.

Referring to FIGS. 1 through 3, the first plate 110 includes a plurality of protrusions 115 formed on a first surface 110a of the flat plate 110. The first plate 110 according to an embodiment includes six protrusions 115, but embodiments are not limited thereto. The first plate 110 may include more than six or less than six protrusions 115. The protrusions 115 may have cylindrical shape. Upper surfaces 115a of the protrusions 115 may have a low surface roughness so that a reaction of the protrusions 115 with the sintering ceramic powder is reduced. For example, the surface roughness of the upper surfaces 115a of the protrusions 115 may be 0.2 µm or less. When the upper surfaces 115a of the protrusions 115 are polished to a surface roughness of 0.2 µm or less, a phenomenon of cohesion of the ceramic powder onto the upper surfaces 115a of the protrusions 115 by pressure in a forming process may be solved.

The surface roughness is a sum of a height and a depth from a level of a surface thereof, and the degree of the surface roughness may be measured by using an optical microscope.

The second plate 120 may include through holes 150 that combine with the protrusions 115. The through holes 150 are hollowed empty spaces. The through holes 150 may include cylindrical portions 151 through which the protrusions 115 enter and exit and conical portions 152 having a taper shape widening towards an upper surface 120a of the second plate 120 from the cylindrical portions 151. Bars 192 (refer to FIG. 4) of a manual press 190 (refer to FIG. 4) may enter and exit in the conical portions 152.

In the case that the second plate 120 is combined with the first plate 110, the upper surfaces 115a of the protrusions 115 may be located in the cylindrical portions 151. That is, the protrusions 115 may occupy a portion of a region of the cylindrical portions 151. The protrusions 115 may have a height h1 less than a height h2 of the cylindrical portions 151. Ceramic powder is supplied onto the protrusions 115 through the through holes 150.

Figure 4:
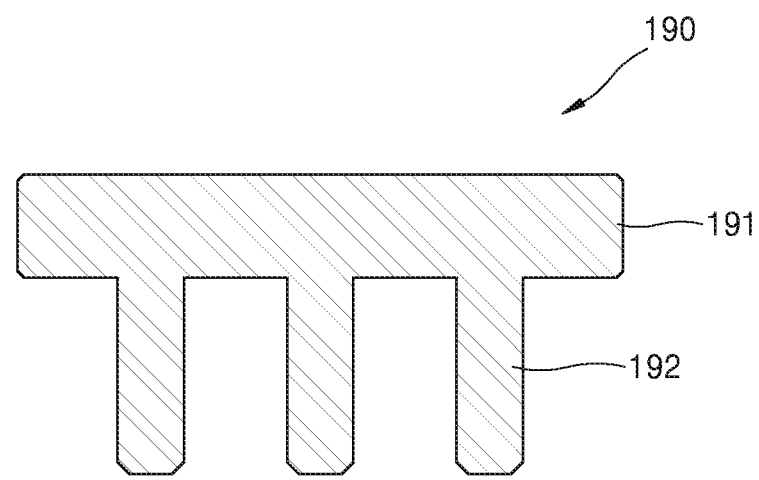
FIG. 4 is a schematic cross-sectional view of a manual press for making a ceramic pellet by filling a sintering jig according to an embodiment with ceramic powder.

FIG. 4 is a schematic cross-sectional view of a manual press 190 for making a ceramic pellet by filling ceramic powder in the sintering jig 100 according to an embodiment.

Referring to FIG. 4, the manual press 190 includes a plate 191 and a plurality of bars 192 extending from the plate 191. The bars 192 may be formed equal to the number of the protrusions 115. As depicted in FIG. 4, an edge of each of the bars 192 may have a shape almost matching to the shape of the conical portion 152 of the through hole 150. However, embodiments are not limited thereto. For example, the shape of the bars 192 may match to the shape of the cylindrical portions 151 of the through holes 150. The manual press 190 may include plastic, for example, polyether ether ketone (PEEK).

The sintering jig 100 according to the present embodiment may form ceramic pellets such that, after placing prepared ceramic powder on the first plate 110 through the through holes 150 of the second plate 120 that is stacked on the first plate 110, the ceramic powder is pressed by using the manual press 190 so that the bars 192 of the plate 191 enter and exit towards the conical portions 152 of the through holes 150. Thus, the ceramic pellets are formed. Next, the forming of ceramic samples is completed by sintering the ceramic pellets that are filled in the sintering jig 100 in a state that the manual press 190 is removed from the second plate 120. An optimum ceramic composition having desired physical properties may be found by measuring the characteristics of the sintered ceramic samples.

Since ceramic pellets formed on the upper surfaces having a low surface roughness of the protrusions 115 of the first plate 110 of the sintering jig 100 are sintered, a phenomenon of coherence of some of the ceramic pellets onto the first plate 110 due to reaction of the ceramic pellets with the first plate 110 of the sintering jig 100 may be reduced.

Also, since a plurality of through holes 150 are formed in the sintering jig 100, the sintering jig 100 may be used for detecting a useful material by using an HTS method.

Figure 5:
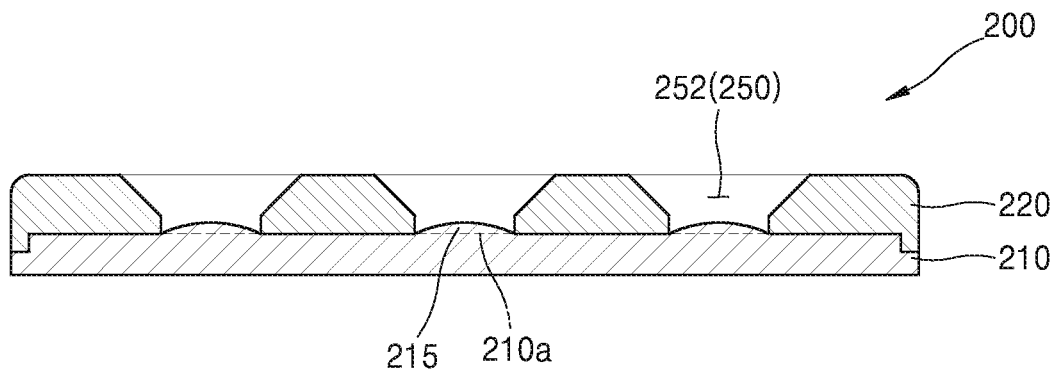
FIG. 5 is a schematic cross-sectional view of a sintering jig according to another embodiment.
Figure 6:
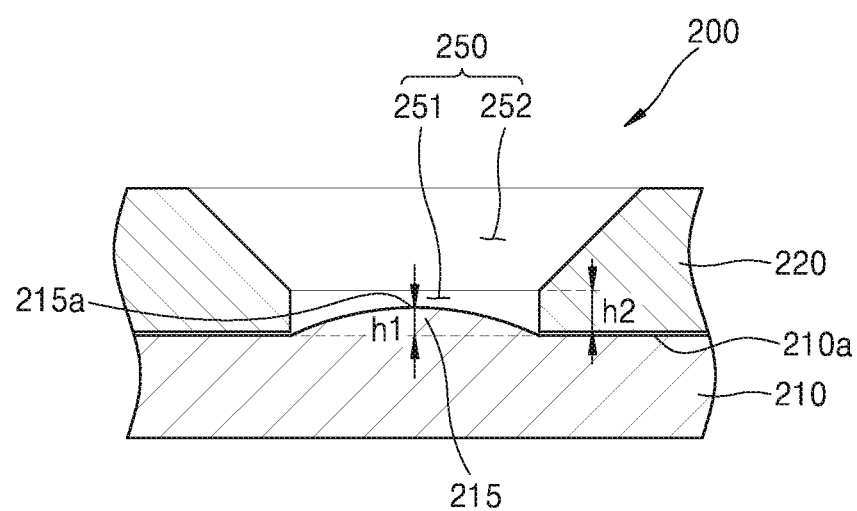
FIG. 6 is a magnified view of a portion of FIG. 5.

FIG. 5 is a schematic cross-sectional view of a sintering jig 200 according to another embodiment. FIG. 6 is a magnified view of a portion of FIG. 5. Like reference numerals are used to indicate constituent elements that are substantially identical to the constituent elements of the sintering jig 100 described with reference to FIG. 1, and thus, the detailed description thereof will be omitted.

Referring to FIGS. 5 and 6, the sintering jig 200 may include a first plate 210 and a second plate 220. The second plate 220 may be stacked on the first plate 210. The first plate 210 may be referred to as a lower plate, and the second plate 220 may be referred to as an upper plate. The first plate 210 and the second plate 220 may be jigs used for sintering ceramic and may include a material that does not react with the ceramic to sinter at a high temperature. The first plate 210 and the second plate 220 may include zirconia.

The first plate 210 includes a plurality of protrusions 215 formed on a first surface 210a of the flat plate 210. The first plate 210 according to the present embodiment includes six protrusions 215. The protrusions 215 may be convex units protruding from a first surface 210a of the first plate 210, and may include convex upper surfaces 215a. a central part of each of the protrusions 215 may convex than peripheral areas thereof. Ceramic pellets formed by the convex protrusions 215 using ceramic powder may contract during a sintering process, and thus, the sintered ceramic may have reduced contact area with the protrusions 215.

The upper surfaces 215a of the protrusions 215 should have a surface roughness so that a reaction between the upper surfaces 215a of the protrusions 215 and the sintered ceramic is reduced. For example, the upper surfaces 215a of the protrusions 215 may have a surface roughness of 0.2 μm or less.

The second plate 220 may include through holes 250 that combine with the protrusions 215. The through holes 250 may include cylindrical portions 251 through which the protrusions 215 enter and exit and conical portions 252 having a taper shape widening upwards from the cylindrical portions 251. When the second plate 220 is combined with the first plate 210, the upper surfaces 215a of the protrusions 215 may be located in the cylindrical portions 251. That is, the protrusions 215 occupy some regions of the cylindrical portions 251. The protrusions 215 may have a height h1 less than a height h2 of the cylindrical portions 251.

In order to sinter ceramic powder filled in the sintering jig 200 according to the present embodiment, the manual press 190 of FIG. 4 may be used.

Ceramic formed by using the sintering jig 200 according to the present embodiment may condense during a sintering process, and accordingly, a contact area between the sintered ceramic and the upper surfaces 215a of the protrusions 215 of the first plate 210 is reduced, and thus, a problem of surface reaction between the first plate 210 and the sintered ceramic is reduced.

Figure 7:
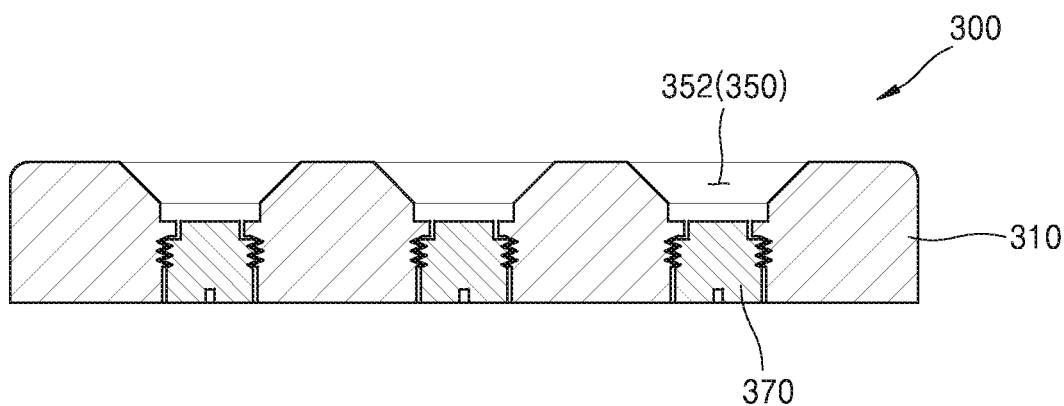
FIG. 7 is a schematic cross-sectional view of a sintering jig according to another embodiment.

FIG. 7 is a schematic cross-sectional view of a sintering jig 300 according to another embodiment. Like reference numerals are used to indicate constituent elements that are substantially identical to the constituent elements of the sintering jig 100 described with reference to FIG. 1, and thus, the detailed description thereof will be omitted.

Referring to FIG. 7, the sintering jig 300 may include a first plate 310. The first plate 310 may include a plurality of through holes 350. The sintering jig 300 may include bolts 370 that fill the through holes 350. The bolts 370 may be cylindrical bolts 370. A combination of the first plate 310 and the cylindrical bolts 370 may be a jig used for sintering ceramic, and may include a material that does not react with the ceramic to sinter at a high temperature. The first plate 310 and the bolt 370 may include zirconia. The bolt 370 has a screw thread 377 on outer surface.

Figure 8:
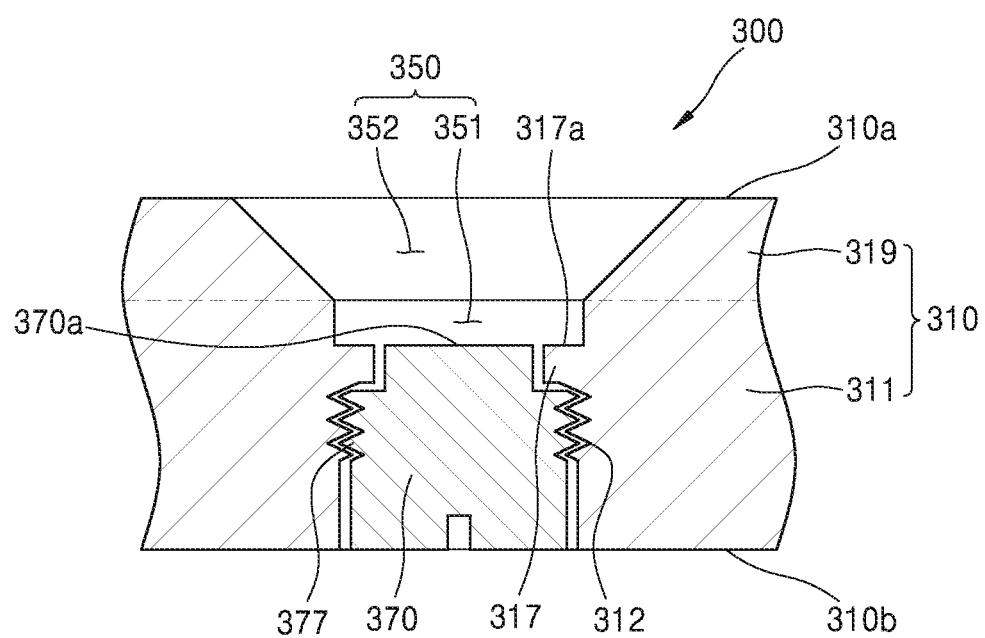
FIG. 8 is a magnified view of a portion of FIG. 7.

FIG. 8 is a magnified view of a portion of FIG. 7.

Referring to FIGS. 7 and 8, the first plate 310 may be a flat plate and may include a plurality of the through holes 350. The first plate 310 according to the present embodiment includes six through holes 350. The first plate 310 may include a first surface 310a and a second surface 310b facing the first surface 310a. The through holes 350 may include conical portions 352 formed from the first surface 310a and cylindrical portions 351 formed from the second surface 310b. The conical portions 352 and the cylindrical portions 351 may be connected to each other.

The first plate 310 includes a first portion 311 forming the cylindrical portion 351 and a second portion 319 forming the conical portion 352. A screw groove 312 and a rim 317 may be formed inside the first portion 311. The screw groove 312 combines with the screw thread 377 of the bolt 370 to form a screw-coupling. The rim 317 may be formed between the screw thread 312 and the second portion 319. The rim 317 protrude inwardly along a circumference of the first portion 311. When the bolt 370 combines with the screw groove 312 of the first plate 310, an upper surface 317a of the rim 317 and an upper surface 370a of the bolt 370 may form a coplanar surface. There is a space to form a ceramic pellet between the coplanar surface and the conical portion 352. The rim 317 may reduce a contact area between the upper surface 370a of the bolt 370 and the ceramic pellet. The rim 317 may support the ceramic pellet or a sintered ceramic thereon in a state when the bolt 370 is removed.

The upper surface 370a of the bolt 370 may have a low surface roughness to reduce a reaction with ceramic thereon. The upper surface 370a of the bolt 370 may have a surface roughness of 0.2 μm or less.

Due to the polished cylindrical bolt 370 of the sintering jig 300 according to the present embodiment, a surface reaction between the sintering jig 300 and the ceramic pellets is reduced, and thus, sintered ceramic may efficiently discharged from the through hole 350.

Figure 9:
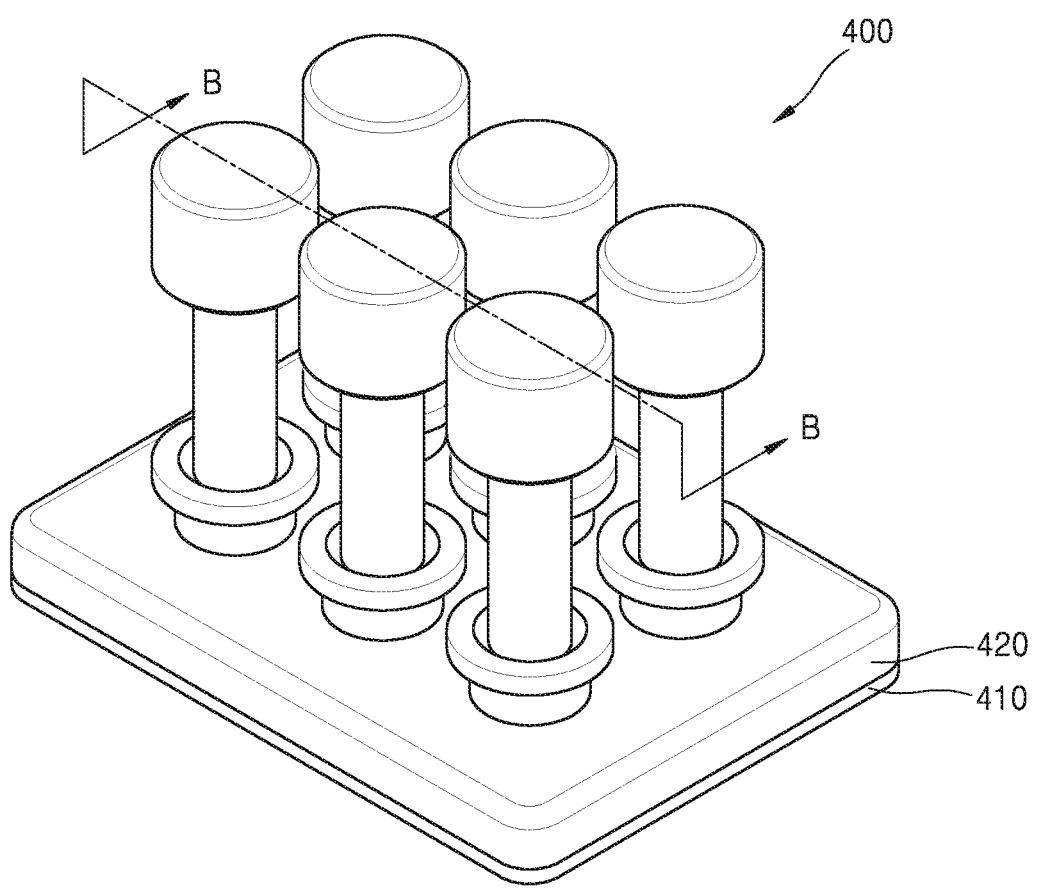
FIG. 9 is a schematic perspective view of a sintering jig according to another embodiment.
Figure 10:
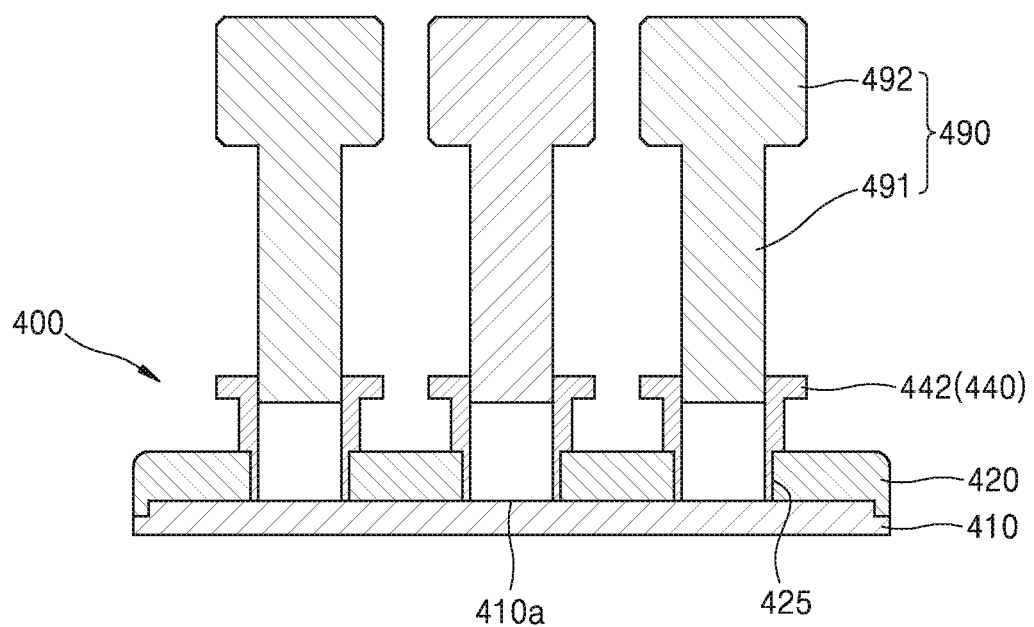
FIG. 10 is a cross-sectional view taken along line B-B of FIG. 9.
Figure 11:
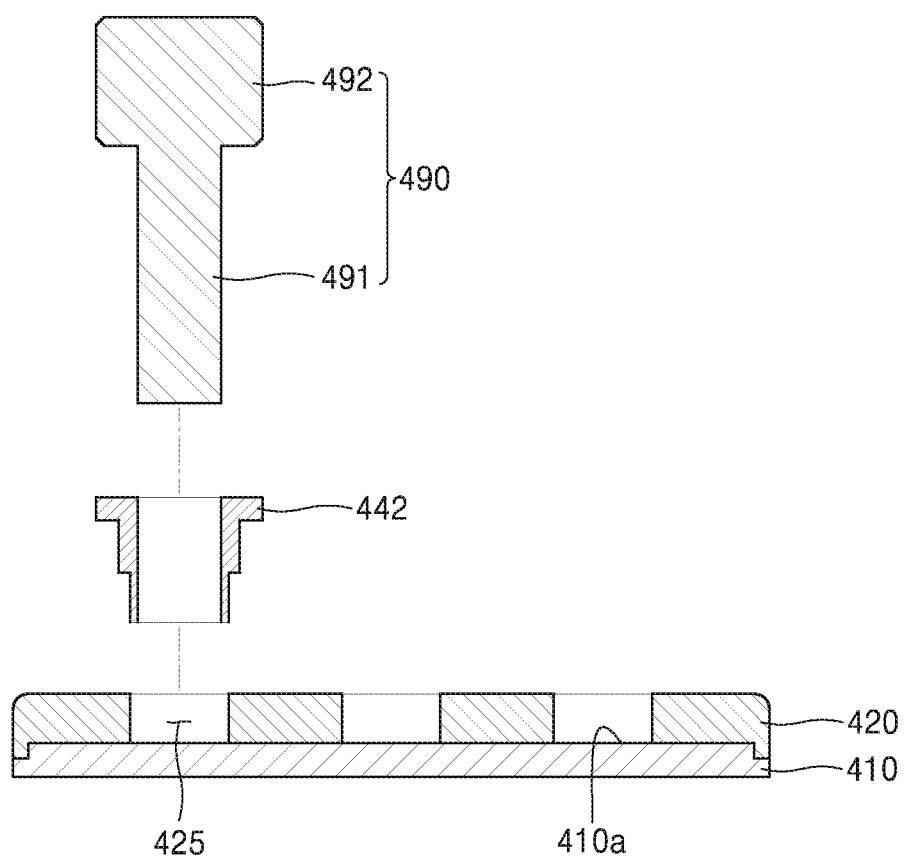
FIG. 11 is an exploded view of the cross-sectional view of FIG. 10.

FIG. 9 is a schematic perspective view of a sintering jig 400 according to another embodiment. FIG. 10 is a cross-sectional view taken along line B-B of FIG. 9, and FIG. 11 is an exploded view of the cross-sectional view of FIG. 10. Like reference numerals are used to indicate constituent elements that are substantially identical to the constituent elements of the sintering jig 100 described with reference to FIG. 1, and thus, the detailed description thereof will be omitted.

Referring to FIGS. 9 through 11, the sintering jig 400 may include a first plate 410 and a second plate 420. The second plate 420 may be stacked on the first plate 410. The first plate 410 may be referred to as a lower plate, and the second plate 420 may be referred to as an upper plate. The second plate 420 may include a plurality of through holes 425. The first plate 410 and the second plate 420 may include zirconia. An upper surface 410a of the first plate 410 may have a low surface roughness to reduce a surface reaction with ceramic powder thereon to be sintered. For example, the upper surface 410a of the first plate 410 may have a surface roughness of 0.2 μm or less.

The second plate 420 according to the present embodiment includes six through holes 425. A hollow guide mold 440 may be arranged in each of the through holes 425. The hollow guide mold 440 may contact the upper surface 410a of the first plate 410. An inner diameter of the hollow guide mold 440 may define an external diameter of ceramic pellet to be formed. A handle portion 442 protruding outwards may be formed on an upper part of the hollow guide mold 440. The hollow guide mold 440 may include plastic, for example, PEEK.

A press 490 for forming ceramic pellet may include a cylindrical portion 491. A handle portion 492 may be formed on an upper part of the cylindrical portion 491. In the present embodiment, the presses 490 are separately formed, but the present embodiment is not limited thereto. For example, as depicted in FIG. 4, a plurality of the cylindrical portions 491 may extend from a single plate (not shown).

A method of using the sintering jig 400 according to the present embodiment will be described. First, the second plate 420 is arranged on the first plate 410. Next, the hollow guide molds 440 are arranged in the through holes 425 of the second plate 420. After filling ceramic powder in the hollow guide molds 440, ceramic pellets are formed by molding and pressing the ceramic powder using the presses 490. After sequentially removing the presses 490 and the hollow guide molds 440 from the second plate 420, then the second plate is removed, and sintered ceramics may be formed through a sintering process. In the molding process of the ceramic powder, after removing the hollow guide molds 440 by pulling the handle portions 442 in a state that the presses 490 are pressed, the presses 490 may be removed first and then the guide molds 440 and the second plate 420 may be removed sequentially. Afterwards, a sintering process may be performed.

In the sintering jig 400 according to the present embodiment, a contact between the molded ceramic pellets and the second plate 420 may be prevented by using the hollow guide molds 440, and thus, a reaction of the ceramic pellets with the second plate 420 may be prevented in a sintering process. Also, due to the polished surface of the first plate 410, a reaction of a surface of the first plate 410 with the ceramic pellets may be reduced.

While one or more embodiments have been described with reference to the figures, it will be understood by those of ordinary skill in the art that various changes in form and details may be made therein without departing from the spirit and scope as defined by the following claims.

What is claimed is:

1. A sintering jig comprising:
   a first plate comprising a plurality of protrusions on an upper surface thereof; and
   a second plate stacked on the first plate and comprising a plurality of through holes corresponding to the plurality of the protrusions,
   wherein each of the plurality of through holes comprises a cylindrical portion configured such that a corresponding one of the plurality of protrusions enters and exits from beneath the second plate, and a conical portion widening from the cylindrical portion towards an upper surface of the second plate.

2. The sintering jig of claim 1, wherein the plurality of protrusions of the first plate occupy a portion of a corresponding one of the plurality of cylindrical portions when the first plate is combined with the second plate.

3. The sintering jig of claim 1, wherein the first plate and the second plate comprise zirconia.

4. The sintering jig of claim 1, wherein an upper surface of each of the plurality of protrusions has a surface roughness of 0.2 µm or less.

5. The sintering jig of claim 1, wherein an upper surface of each of the plurality of protrusions is a convex surface in which a central portion of the convex surface protrudes upwards.

6. The sintering jig of claim 1, wherein the cylindrical portion and the conical portion are contiguous.

7. The sintering jig of claim 1, wherein the plurality of protrusions is configured such that, upon entering, from beneath, a corresponding one of the through holes, the corresponding protrusion does not enter the conical portion of the corresponding through hole.

8. The sintering jig of claim 1, wherein a shape of each of the plurality of protrusions matches with a corresponding one of the plurality of through holes when viewed in a plan view.

* * * * *